March 31, 1942.  D. A. SWANSON  2,277,727
CONVERTIBLE TANDEM BICYCLE
Filed Jan. 3, 1939
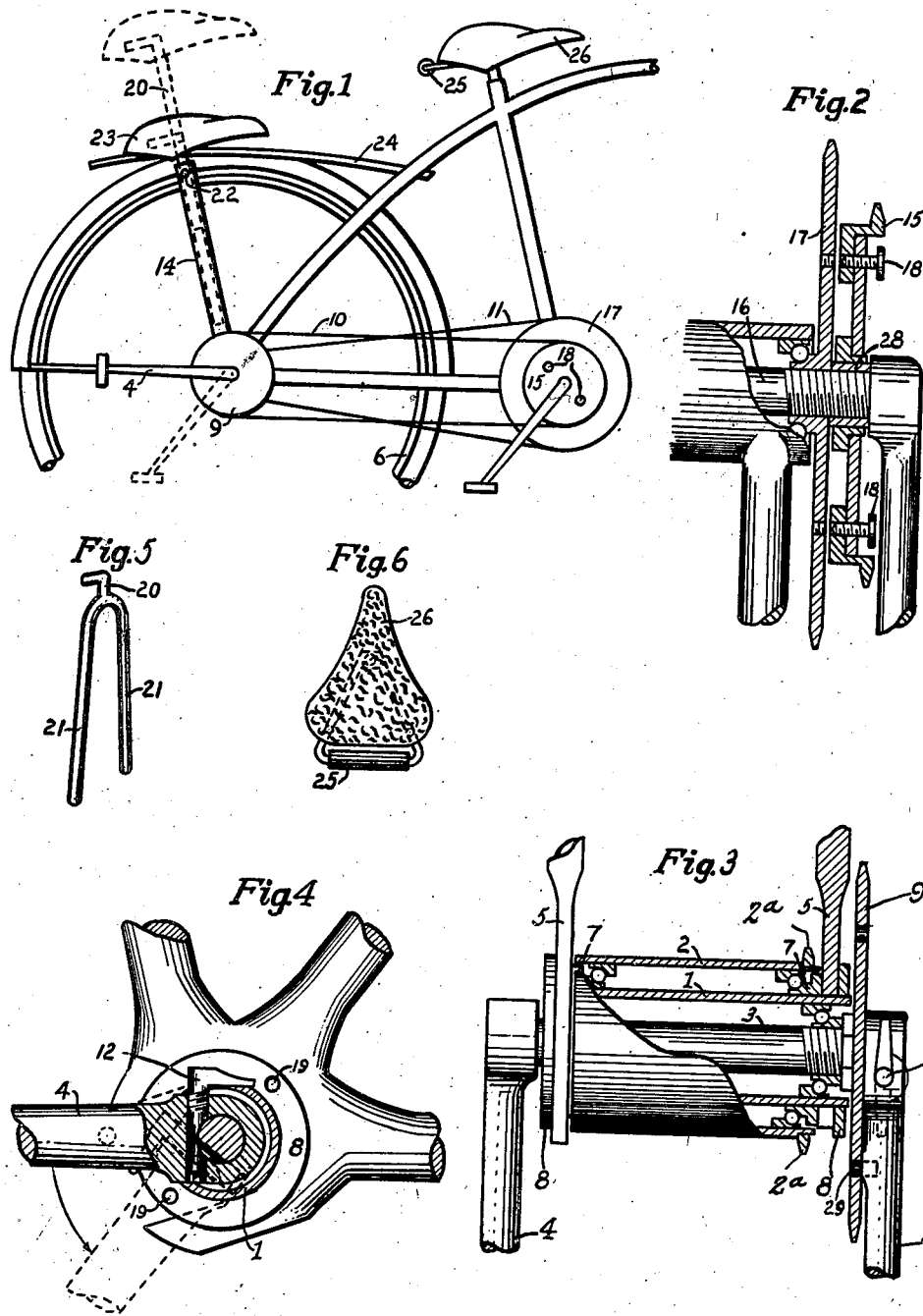
INVENTOR.
David A. Swanson Patented Mar. 31, 1942

2,277,727

UNITED STATES PATENT OFFICE 2,277,727

CONVERTIBLE TANDEM BICYCLE

David A. Swanson, Chicago, Ill.

Application January 3, 1939, Serial No. 249,087

5 Claims. (Cl. 74—216.5)

My invention relates to bicycles which are formed or provided with a tandem attachment, and more particularly to those in which the tandem drive is mounted in the rear wheel center, and my main object is to provide a support for the rear-wheel running gear which is rigidly connected to the rear frame assembly and relieves the rear wheel of strains imposed by the weight or pedal movements of the tandem rider.

A further object of the invention is to design the gearing of the bicycle in a manner to permit the tandem pedal drive to be connected to or disconnected from the regular pedal drive by a small manual adjustment.

A still further object of the invention is to construct the tandem attachment and its connections to the main drive along lines of simplicity and efficiency.

With the above objects in view and any others which may suggest themselves from the description to follow, a better understanding of the invention may be had by reference to the accompanying drawing, in which—

Fig. 1 is an elevation of the rear portion of a bicycle, showing the tandem attachment in position;

Fig. 2 is a horizontal section on an enlarged scale of the main pedal drive;

Fig. 3 is a horizontal section partly in elevation of the pedal drive in the rear wheel center;

Fig. 4 is an elevation of a fragment of a rear fork assembly, showing a pedal crank connection in section;

Fig. 5 is a perspective view of a seat post employed in the tandem attachment; and Fig. 6 is a plan view of the main bicycle seat, showing a hand grip for the tandem rider.

Referring specifically to the drawing, I denotes a steel tube which is designed to serve as an axle for the regular rear wheel hub 2. The shaft for the rear pedal cranks 4 is indicated at 3 and is journaled in ball bearings within the tube 1, as shown in Fig. 3. The rear fork extremities 5 are slotted in the usual manner—as indicated in Fig. 4—to receive the tube 1, which carries cones 7 inwardly of the fork extremities 5 to journal the wheel hub 2 by means of ball bearings on the tube. Outside the fork extremities, the tube 1 is externally threaded to receive ring nuts 8 which rigidly secure the tube to the fork extremities; and the ring nuts 8 are formed with diametrically-opposite cavities 19 for the application of a spanner wrench when the ring nuts are to be adjusted.

The crank shaft 3 extends from the tube 1 to receive a sprocket 9, from which a chain 10 extends forwardly to a sprocket 15 which is freely journaled on the hub 28 of the regular or frontal crank shaft 16, whose application to the bicycle frame is otherwise standard. The sprocket of the frontal shaft 16 is indicated at 17, and a chain 11 connects this sprocket with one 2a on the rear wheel hub 2 in the usual manner. Thus, the regular chain drive of the bicycle is supplemented by a companion chain drive from the rear wheel pedal cranks 4. As described, this chain drive is not effective on the main drive when the rear pedal cranks are operated because the sprocket 15 is freely disposed on the frontal crank shaft; however, the sprocket 15 is quickly engageable with the sprocket 17 by the advancement of two thumbscrews 18 which are threaded into the sprocket from the outside at diametrically-opposite points, and are adapted to enter similarly located and tapped bores in the main sprocket 17. Thus, with the sprockets 15 and 17 connected, the rear pedal drive operates to assist the front one. It follows, therefore, that when the tandem is not used, the screws 18 may be retracted to disconnect the sprocket 15 and eliminate the idle rotation of the rear pedal cranks 4. In this event, one of these may be suitably connected to the rear mud guard bracket by any suitable device; and the other may be similarly positioned by means of a device illustrated in Figs. 3 and 4. Thus, a key 12 may be threaded into the corresponding crank 4 and formed with a side recess conforming to and in contact with the periphery of the shaft 3. The latter has a concave recess in the side which is adapted to come opposite the key 12 when the crank is in the horizontal position. Thus, a partial turn of the key 12 will cause the same to fill the recess in the shaft and lock the crank in the said position.

Fig. 5 illustrates that the tandem seat post 20 is branched with two sections 21. These enter tubes 14 which rise from the junction of the rear wheel forks as indicated in Fig. 4. Screws 22 are directed by way of the tubes 14 toward the respective sections 21, the screws 22 being adjustable to set the seat at different heights, one such position being indicated by dotted lines in Fig. 1.

The tandem seat 23 is connected by a truss 24 to the bicycle frame in order to reinforce it. The main seat 26 is formed with a free-rolling hand grip 25 at the rear for the use of the tandem rider in lieu of a handle bar.

It will be evident from the above description that I have provided a simple development of the single bicycle to render the same suitable for tandem use. First, the gearing between the front and rear pedal drives is compact and inconspicuous, particularly because of the side-by-side position of the drive chains, so that the vehicle does not look unduly complicated while it is being used as an ordinary bicycle. Further, the design of the support for the tandem seat in the region of the rear wheel hub is unique due to the fact that the axial tube 1, which forms a bearing for both the wheel hub 2 and the crank shaft 3, is rigidly attached to the rear fork extremities, so that the rear wheel is not subjected to strains from the weight of the tandem rider or stresses imposed upon the hub by the operation of the rear pedal drive. Yet, the disposal of the axial tube does not prevent the adjustment of the wheel to take up chain slack, as the slight release of the ring nuts will permit the hub assembly to be moved in one or the other direction in respect to the rear fork extremities. Further, the axial tube constitutes a rigid foundation for the inner and outer ball bearings, so that these cannot be thrown out of line by any shocks the rear wheel may receive or any stresses imposed by the rear pedal drive. The rear wheel hub 2 and the rear crank shaft 3 cannot therefore deviate from their axial positions in the rear fork assembly as long as the axial tube 1 is held fast in the same.

While I have described the invention along specific lines, various minor changes and refinements may be made without departing from its principle, and I desire to consider all such changes and refinements as coming within the scope and spirit of the appended claims.

I claim:

1. In a tandem drive for bicycles, including a front pedal drive shaft and sprocket thereon, a rotatable rear hub and driven sprocket thereon, and a chain operatively connecting said sprockets; a rear pedal crank shaft and drive sprocket therefor journalled in said rear hub, a front driven sprocket journaled on said front shaft adjacent said front drive sprocket, a chain operatively connecting said last two sprockets, and means detachably connecting said two front sprockets together for unitary operation, said means comprising thumbscrews threaded through the driven sprocket into cavities made at corresponding points in said front drive sprocket.

2. In a tandem drive for bicycles, including a front pedal drive shaft and sprocket thereon, a rotatable rear hub and driven sprocket thereon, and a chain operatively connecting said sprockets; a rear pedal crank shaft and drive sprocket therefor journaled in said rear hub, a front driven sprocket journaled on said front shaft adjacent said front drive sprocket, a chain operatively connecting said last two sprockets, and means detachably connecting said two front sprockets together for unitary operation, said means comprising thumbscrews threaded through the driven sprocket into tapped cavities made at corresponding points in said front drive sprocket.

3. In a tandem drive for bicycles, including a front pedal drive shaft, a rear driven hub, and front drive means on said shaft and operatively connected with said hub; a tubular rear axle on which said hub is rotatable, a rear pedal crank shaft journaled in said axle, front driven means journaled on said front drive shaft, an operative connection between said rear crank shaft and said front driven means, and means detachably connecting said front driven means to said front drive means for unitary operation.

4. A tandem drive for bicycles comprising a front pedal crank shaft and front drive sprocket thereon, a tubular rear wheel axle, a driven sprocket rotatable on said axle, a chain connecting said drive and driven sprockets, a second pedal crank shaft journaled in said axle, a rear drive sprocket carried by said second pedal crank shaft, a front driven sprocket journaled on said front pedal crank shaft alongside said front drive sprocket, a chain connecting the rear drive sprocket with said front driven one, and means detachably connecting the front driven sprocket with the front drive sprocket.

5. In a tandem drive for bicycles, including a front pedal drive shaft, a rear driven hub, front drive means on the shaft and operatively connected with said hub, and rear-fork unions formed with slotted terminals; a tubular rear axle on which said hub is rotatable and having threaded end portions passing through said slotted terminals, abutments carried by the axle inwardly of said terminals, nuts threaded on the axle end portions to clamp said terminals to said abutments, the latter being formed as ball bearing cones, races internally of said hub to journal the same on said cones, a rear pedal crank shaft journaled in said axle, front driven means journaled on said front drive shaft, an operative connection between said rear crank shaft and said front driven means, and means detachably connecting said front driven means to said front drive means for unitary operation.

DAVID A. SWANSON.